United States Patent
Verma

(10) Patent No.: US 9,166,653 B2
(45) Date of Patent: Oct. 20, 2015

(54) NFC SENSOR WITH POWER SLEEP MODE

(71) Applicant: Chetan Verma, Bangalore (IN)

(72) Inventor: Chetan Verma, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 41 days.

(21) Appl. No.: 14/134,584

(22) Filed: Dec. 19, 2013

(65) Prior Publication Data
US 2015/0180543 A1   Jun. 25, 2015

(51) Int. Cl.
*H04B 7/00* (2006.01)
*H04B 5/00* (2006.01)
*G06F 3/0488* (2013.01)
*H04B 1/68* (2006.01)

(52) U.S. Cl.
CPC ............ *H04B 5/0031* (2013.01); *G06F 3/0488* (2013.01)

(58) Field of Classification Search
CPC ............................ H04W 84/18; H04M 1/8253
USPC .................................................. 455/41.1–41.3
See application file for complete search history.

(56) References Cited

U.S. PATENT DOCUMENTS

| 7,899,408 B1 * | 3/2011 | Balardeta et al. ................ 455/73 |
| 2007/0188323 A1 * | 8/2007 | Sinclair et al. ............. 340/568.1 |

* cited by examiner

*Primary Examiner* — Lee Nguyen
(74) *Attorney, Agent, or Firm* — Sutherland Asbill & Brennan LLP

(57) ABSTRACT

This disclosure describes systems, methods, and computer-readable media related to near field communication (NFC) sensors with power sleep mode. In some embodiments, one or more motions of a user device may be detected. The one or more motions may be analyzed to identify a pre-defined motion of a user device. A wireless sensor of the user device may be enabled in response to the identified pre-defined motion. A wireless sensor-enabled device may be determined to be within a pre-determined distance. Data may be exchanged with the wireless sensor-enabled device. The wireless sensor may be disabled upon completion of the data exchange.

21 Claims, 5 Drawing Sheets

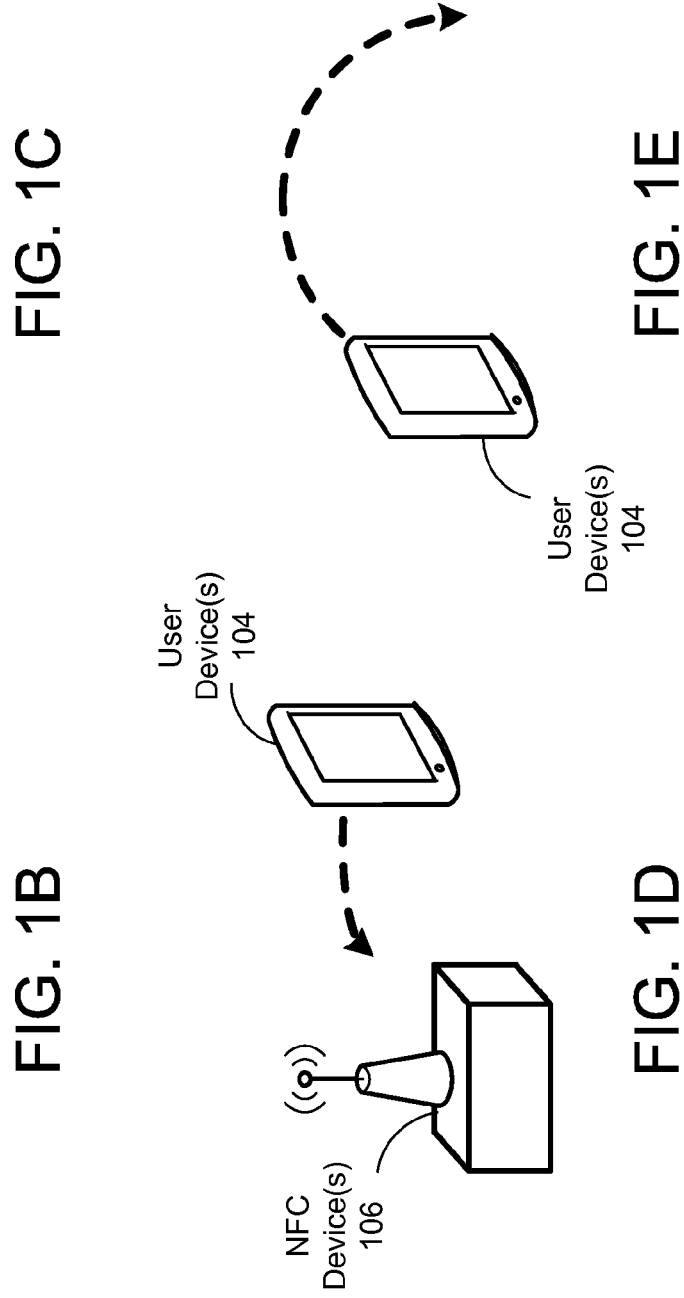

ved in a straight line in a swiping motion. FIG. 1D depicts

NFC SENSOR WITH POWER SLEEP MODE

BACKGROUND

User devices are becoming more prevalent and often are available as different types of devices, such as electronic readers (also called "e-readers"), smartphones, tablets, laptops, wearable computers, all-in-one PCs, and the like. User devices are often able to utilize sensors, such as near field communication sensors to poll or otherwise search for other devices within the vicinity with which to communicate. However, such constant polling may deplete the power reserves of user devices quickly. In some embodiments, user devices may have a soft switch, such as through a user interface, to permanently switch off the NFC sensors. Such a solution would require the user to manually enable the sensor whenever the sensor is needed, which may be cumbersome and require too much time and effort.

BRIEF DESCRIPTION OF THE DRAWINGS

The detailed description is set forth with reference to the accompanying drawings. The use of the same reference numerals indicates similar or identical components or elements; however, different reference numerals may be used as well to indicate components or elements which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa.

FIGS. 1B-1E depict illustrative motions of user devices that may associated with an NFC sensor with power sleep mode in accordance with one or more embodiments of the disclosure.

DETAILED DESCRIPTION

This disclosure relates to, among other things, systems, methods, computer-readable media, techniques, and methodology for near field communication (NFC) sensors or subsystems of user devices to be equipped with a power sleep mode. The NFC sensors or subsystems of a user device, such as a mobile phone or tablet, may be placed in a sleep mode. The sleep mode may be a low power mode where the NFC transmitter and receiver are disabled and the NFC baseband may be in a low power mode until a pre-determined motion of the user device is detected by other sensors of the user device, such as an accelerometer, gyroscope, and/or compass. In some embodiments, a touch-based gesture may be associated with the user device to wake up the NFC sensor. Once the pre-determined motion of the user device is detected, the NFC sensor or subsystem may be enabled. The NFC sensor or subsystem may poll or otherwise search for nearby NFC devices, such as a tag or reader. If the NFC sensor or subsystem detects a nearby NFC device, the NFC sensor or subsystem may establish a connection with the device and exchange data. Once the data exchange is complete, the NFC sensor or subsystem may be placed back into sleep mode.

In some embodiments, the user may select from pre-determined motions of a user device or may define motions of the user device or may create or configure a motion of a user device to be associated with waking up the NFC sensor or subsystem. Additionally, the user may select the pre-determined amount of time the NFC sensor or subsystem may poll or search for NFC devices before going back to sleep mode.

Various illustrative embodiments have been discussed above. These and other example embodiments of the disclosure will be described in more detail hereinafter through reference to the accompanying drawings. The drawings and the corresponding description are provided merely for illustration and are not intended to limit the disclosure in any way. It should be appreciated that numerous other embodiments, variations, and so forth are within the scope of this disclosure.

Illustrative Use Cases and System Architecture

Figure 1A:
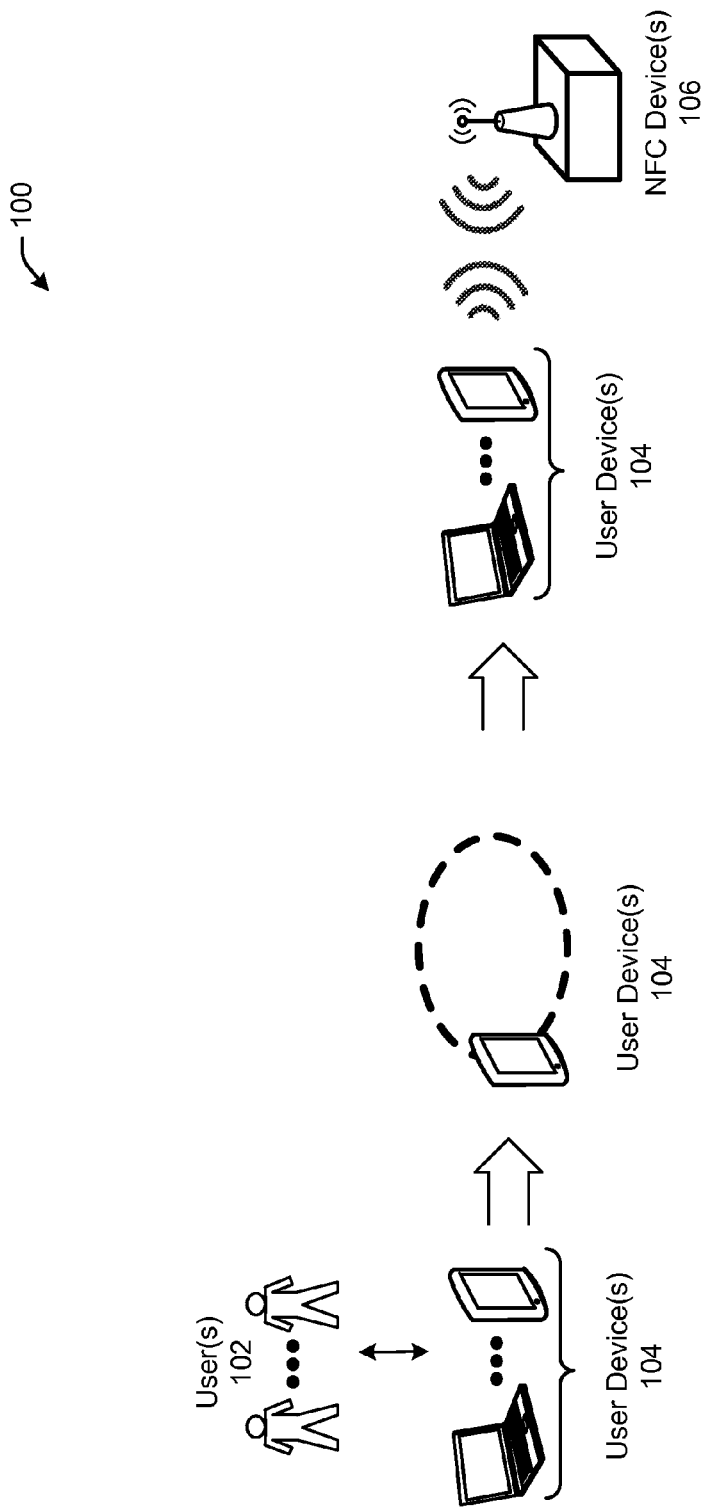
FIG. 1A depicts an illustrative data flow between various components of an illustrative system architecture for NFC sensor with power sleep mode in accordance with one or more embodiments of the disclosure.

FIG. 1A depicts an illustrative data flow between various components of an illustrative system architecture for power sleep mode in near field communication (NFC) sensors or subsystems of user devices in accordance with one or more embodiments of the disclosure. One or more illustrative user device(s) 104 operable by one or more user(s) 102 are illustratively depicted in FIG. 1. The user device(s) 104 may include any suitable processor-driven computing device including, but not limited to, a laptop computing device, a smartphone, a tablet, a wearable computer, an all-in-one PC, and so forth. For ease of explanation, the user device(s) 104 may be described herein in the singular; however, it should be appreciated that multiple user device(s) 104 may be provided. For illustrative purposes, this disclosure generally describes the methods and systems in the context of near field communication sensors and subsystems. However, the sensors with sleep mode as described herein may be generally applicable to other types of technology to enable power savings of a user device, such as Bluetooth, barcode and quick response code readers, and the like.

The user device 104 may detect a motion of the user device 104. In some embodiments, the motion of the user device 104 may have been selected from a predetermined list of motions or configured by a user 102 to wake the NFC sensor. In some embodiments, the user 102 may move the user device 104 in a circular motion (as depicted). In some embodiments, the user 102 may move the user device in a sequence of user 102 selected predetermined movements. The user device 104 may recognize the user 102 specified motion of the user device 104 and enable or wakeup the NFC sensor of subsystem. The NFC sensor of subsystem may poll or otherwise search for nearby NFC devices 106. Once an NFC device has been located, the user device 104 may establish a connection with the NFC device 106 and exchange data with the NFC device 106. Upon completion of the data exchange, the NFC sensor or subsystem may return to sleep mode (e.g., disabling the NFC sensor or subsystem) until the next motion is detected. In some embodiments, if the user device 104 does not detect an NFC device 106 nearby within a pre-determined time period, then the NFC sensor or subsystem may return to sleep mode.

FIGS. 1B-1E depict illustrative motions of user devices 104 that may associated with an NFC sensor with power sleep mode in accordance with one or more embodiments of the disclosure. FIG. 1B depicts a user device 104 being moved in a circular motion. FIG. 1C depicts a user device 104 being moved in a straight line in a swiping motion. FIG. 1D depicts a tapping motion by the user device 104 towards an NFC device 106. FIG. 1E depicts a user device 104 being moved in a wave or arc motion. In some embodiments, the motions depicted may be custom configured by the user 102. In some embodiments, the motions associated with waking an NFC sensor or subsystem may require a series of motions of the user device 104.

Figure 2A:
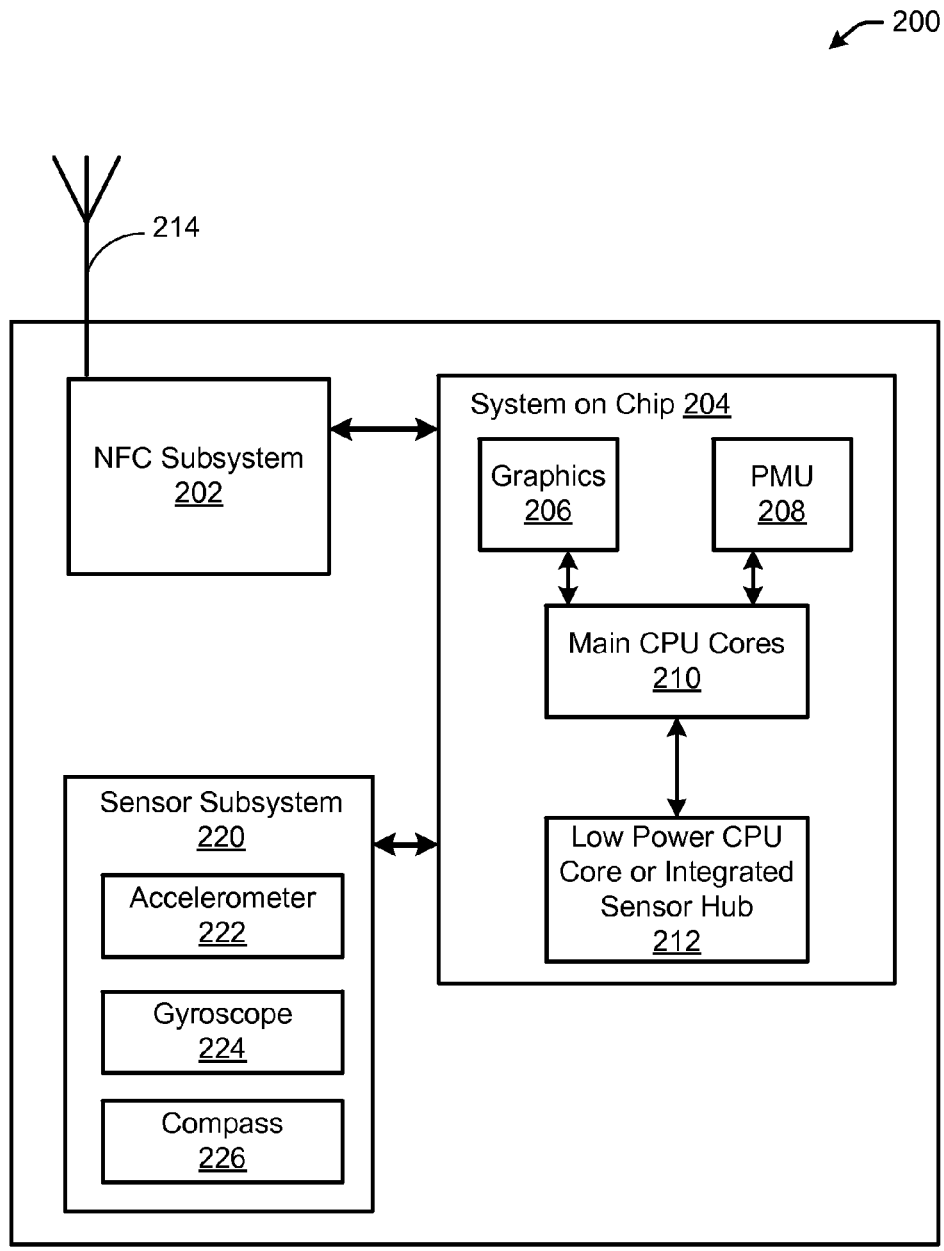
FIGS. 2A-2B are block diagrams including various hardware and software components of the illustrative system architecture depicted in FIG. 1 in accordance with one or more embodiments of the disclosure.
Figure 2B:
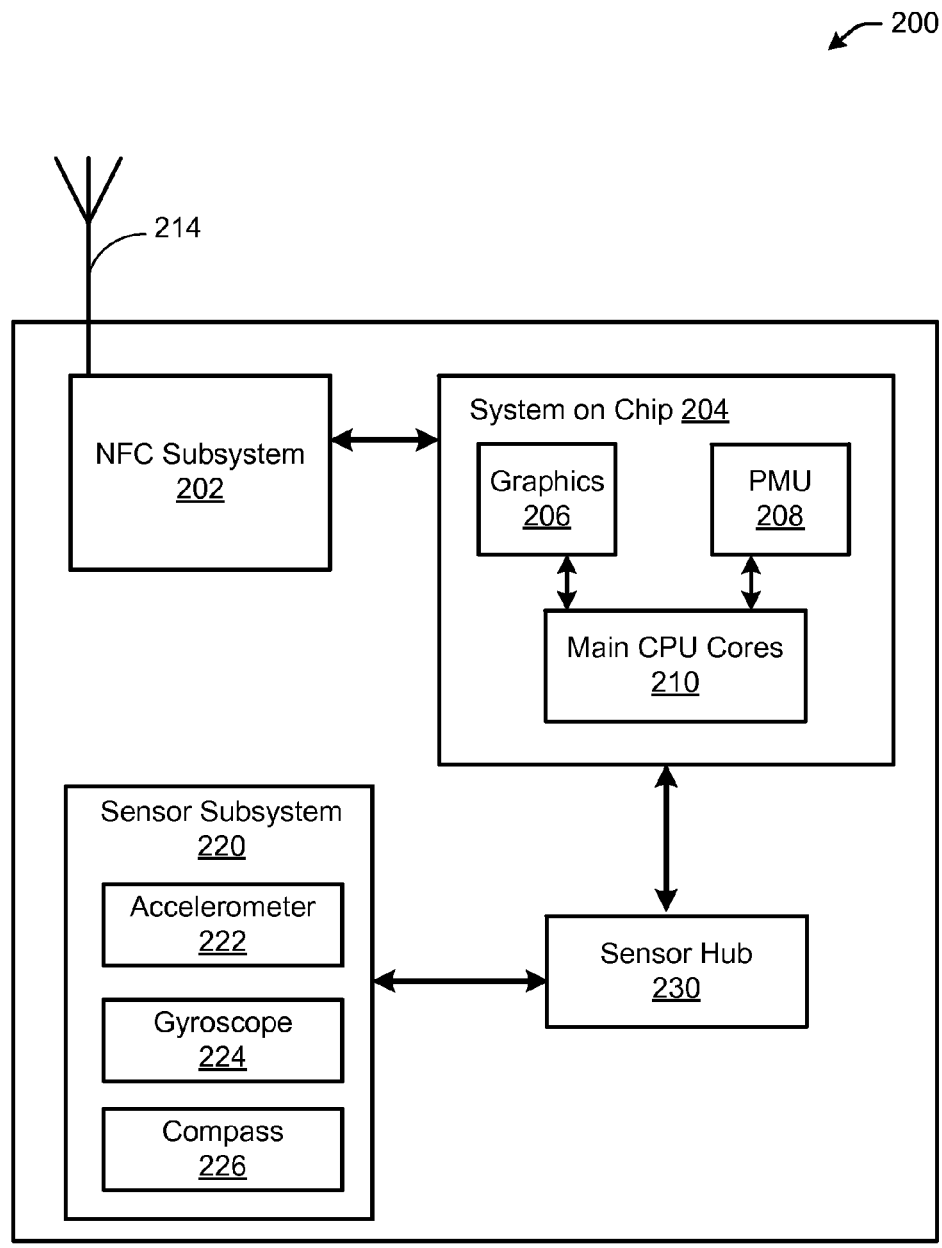

FIGS. 2A and 2B are block diagrams including various hardware and software components of the illustrative system architecture depicted in FIG. 1 in accordance with one or more embodiments of the disclosure. The illustrative system architecture 200 of a user device 104 depicted in FIG. 2A is an example implementation depicting a low power CPU core integrated within a System-on-a-Chip (SoC) and may include an antenna 214, an NFC subsystem 202, SoC 204, and a sensor subsystem 220. The SoC may comprise a graphics component 206, a power management unit (PMU) 208, one or more main CPU cores 210, and/or one or more low power CPU cores 212. In some embodiments, the lower power CPU core may be an integrated sensor hub. An integrated sensor hub may process data from different sensors and pass along the processed data to one or more main CPU cores 210 for further processing. The sensor subsystem 220 may include, but is not limited to, an accelerometer 222, a gyroscope 224, and/or a compass 226.

The NFC subsystem 202 may include an NFC analog front end and an NFC baseband. The NFC analog front end may receive radio signals from the antenna 214 and convert the analog signals into digital signals and may transmit digital signals into radio signals for transmission to other NFC enabled devices 106. The NFC baseband may receive the converted digital signals and interpret and transmit the converted digital signals. For example, the NFC baseband of the NFC subsystem 202 may transmit the converted digital signals to the SoC 204. The NFC subsystem 202 may be put in a power sleep mode, where the NFC transmitter and receiver are deactivated or powered off and the NFC baseband may be in a low power mode until the main CPU cores 210 activate or wake up the NFC subsystem 202.

The SoC 204 may be an integrated circuit that integrates components of a computer or electronic system into a single chip. The SoC 204 may include a graphics component 206 which may be responsible for generating a feed of output images to a display, such as the display of the user device 104. The SoC 204 may include a PMU 208. The PMU 208 may be a microcontroller that governs power functions of the SoC 204. The PMU 208 may include firmware and/or software, a CPU, input/output functions, and/or analog to digital converters. The PMU 208 may remain active when the user device 104 is shut down and may be powered by a backup battery. The PMU 208 may be responsible for several functions, which may include but are not limited to monitoring power connections and battery charges, charging batteries when necessary, controlling power to other integrated circuits, shutting down unnecessary system components when they are idle, and/or controlling sleep and power functions.

The SoC 204 may include one or more main CPU cores 210. The main CPU cores 210 may include any suitable processing unit capable of accepting digital data as input, processing the input data based on stored computer-executable instructions, and generating output data. Computer-executable instructions may be stored, for example, in data storage and may include, among other things, operating system software and application software. The computer-executable instructions may be retrieved from the data storage and loaded into memory as needed for execution. The main CPU cores 210 may be configured to execute the computer-executable instructions to cause various operations to be performed.

The SoC 204 may include one or more low power CPU cores 212. In some embodiments, at least one of the one or more low power CPU cores 212 may be an integrated sensor hub (ISH). The low power CPU cores 212 or ISH may receive data received from the sensor subsystem 220. The low power CPU cores 212 may analyze the data and determine whether any defined motion or gesture has occurred. If a pre-determined motion or gesture has been detected, the low power CPU core 212 or ISH may transmit a notification to the main CPU cores 210, which may in turn activate or wake up the NFC subsystem 202 from a power sleep mode.

The sensor subsystem 220 may detect or otherwise identify touch-based gestures or movements of the user device 104. The sensor subsystem 220 may include such detection devices as an accelerometer 222, gyroscope 224, or a compass 226. For touch-based gestures, the user device 104 may detect the gesture via a touchscreen of the user device 104. The sensor subsystem 220 may continuously feed or transmit data to the low power CPU core 212 or ISH for interpretation and analysis. In some embodiments, a user 102 may generate or create a motion or gesture of a user device 104 to be associated with waking up the NFC subsystem 202. The user device 104 may request the user to specify a motion or gesture, which may be captured or detected by the sensor subsystem 220 and transmitted to the low power CPU core 212 to be associated with waking up the NFC subsystem 202. For example, the motion of moving the user device 104 (e.g., tapping motion depicted in FIG. 1D) closer to an NFC device 106 may be sufficient to wake up the NFC subsystem 202 from a sleep mode or state.

FIG. 2B is a block diagram including various hardware and software components of the illustrative system architecture depicted in FIG. 1 in accordance with one or more embodiments of the disclosure. The illustrative system architecture 200 of a user device 104 depicted in FIG. 2B is an example implementation depicting a sensor hub outside of an SoC 204. FIG. 2B has similar components to FIG. 2A with the exception that the SoC 204 does not have a sensor hub integrated in the SoC 204. Rather, the user device 104 includes a discrete sensor hub 230 positioned between the SoC 204 and the sensor subsystem 220. In the configuration depicted, the sensor subsystem transmits or feeds data to the sensor hub 230, which may analyze the gestures or movements detected by the sensors of the sensor hub 220. Once the sensor hub 220 determines that a detected gesture or movement correlates to a pre-defined gesture or movement to activate or wakeup the NFC subsystem from a sleep mode, the sensor hub 230 may transmit a notification to the SoC 204 which may in turn transmit a signal to the NFC subsystem 202 to activate or wake up the NFC subsystem to poll or detect nearby tags or devices, such as NFC devices 106.

Those of ordinary skill in the art will appreciate that any of the components of the system architecture 200 may include alternate and/or additional hardware, software, or firmware components beyond those described or depicted without departing from the scope of the disclosure. More particularly, it should be appreciated that hardware, software, or firmware components depicted or described as forming part of any of the illustrative components of the system architecture 200, and the associated functionality that such components support, are merely illustrative and that some components may not be present or additional components may be provided in various embodiments. While various program modules have been depicted and described with respect to various illustrative components of the system architecture 200, it should be appreciated that the functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of hardware, software, and/or firmware for implementing the functionality. Accordingly, it should be appreciated that the functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Further, while certain modules may be depicted and described as sub-modules of another module, in certain embodiments, such modules may be provided as independent modules.

Those of ordinary skill in the art will appreciate that the illustrative system architecture 200 is provided by way of example only. Numerous other operating environments, system architectures, and device configurations are within the scope of this disclosure. Other embodiments of the disclosure may include fewer or greater numbers of components and/or devices and may incorporate some or all of the functionality described with respect to the illustrative system architecture 200, or additional functionality.

Illustrative Processes

Figure 3:
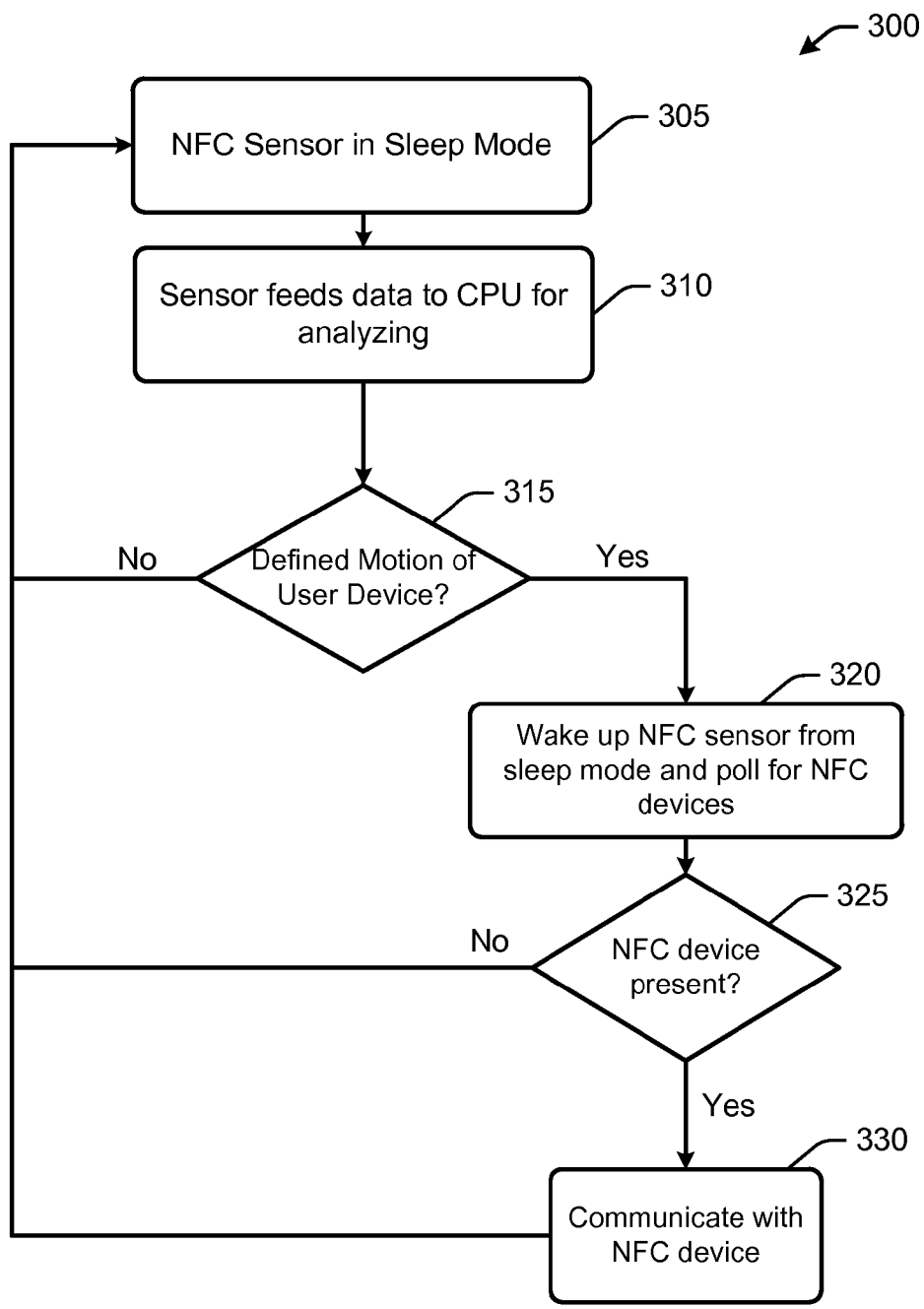
FIG. 3 is a process flow diagram of an illustrative method for NFC sensor with power sleep in accordance with one or more embodiments of the disclosure.

FIG. 3 is a process flow diagram of an illustrative method 300 for NFC sensors with power sleep mode in accordance with one or more embodiments of the disclosure. At block 305, the sleep mode of an NFC subsystem 202 of a user device 104 may be activated. At block 310, sensor subsystem 220 may capture or detect one or more motions of the user device 104 and transmit the data to the low power CPU core 212 (or ISH) or the sensor hub 230, depending on the configuration, of the user device 104 for analyzing. For example, user device 104 may have one or more sensors associated with the sensor subsystem 220, such as an accelerometer 222, gyroscope 224, or compass 226 that may capture or detect motions of a user 102 using the user device 104.

At block 315, the low power CPU core 212 (or ISH) or the sensor hub 230 or other component of the user device 104 may determine whether the captured or detected input corresponds to a pre-defined motion earlier selected by a user 102 to be associated with waking up an NFC sensor. If the captured or detected input does not correspond to the pre-defined motion, then the process returns to block 305. If the captured or detected input does correspond to the pre-defined motion, then the low power CPU core 212 (or ISH) or the sensor hub 230 may transmit a notification or indication to the main CPU core 210 to activate or wake up the NFC subsystem 202 and the process may proceed to block 320.

At block 320, the main CPU core 210 may activate the NFC subsystem 202 from sleep mode and the NFC sensor may poll for nearby NFC devices 106. In some embodiments, the NFC subsystem 202 may poll until a nearby NFC device 106 is detected. In some embodiments, the NFC subsystem 202 may poll until a pre-determined amount of time (e.g., 5 seconds) has elapsed.

At block 325, the main CPU core 210 or other component of the user device 104 may determine whether an NFC device 106 is present within a pre-determined distance from the user device 104. If it is determined that an NFC device 106 is not present, then the process may proceed back to block 305, where the NFC subsystem 202 of the user device 104 is returned to sleep mode. If it is determined that an NFC device 106 is present, then the process may proceed to block 330.

At block 330, the user device 104 may establish a connection with the NFC device 106 based at least in part on the NFC subsystem and exchange data with the NFC device 106. Upon completion of the exchange of data, the process may proceed back to block 305, where the NFC subsystem 202 is returned to sleep mode.

In some embodiments, the NFC subsystem 202 may be deactivated and enter sleep mode if moving the user device in a predefined motion selected or configured by the user. In some embodiments, the predefined motion of the user device used to return the NFC subsystem 202 to sleep mode may be the same motion that is used to wake the NFC subsystem 202 from sleep mode or may be a different motion designated by the user.

In one embodiment, a non-transitory computer-readable medium may store computer-executable instructions which, when executed by a processor, cause the processor to perform operations including detecting one or more motions of a user device; analyzing the one or more motions to identify a pre-defined motion; enabling a wireless sensor in response to the identified pre-defined motion; determining that a wireless sensor-enabled device is within a pre-determined distance; exchanging data with the wireless sensor-enabled device; and disabling the wireless sensor upon completion of the exchange of data.

In one aspect of an embodiment, the one or more motions may be a touch-based gesture input.

In one aspect of an embodiment, the pre-defined motion may be at least one of a tap motion, a wave motion, a circular motion, a swipe motion, or a user-defined custom motion of the user device.

In one aspect of an embodiment, the one or more motions may be detected by one or more sensors that may include at least one of an accelerometer, a gyroscope, or a compass.

In one aspect of an embodiment, the computer-executable instructions may cause the processor to perform further operations including disabling a baseband, analog transmitter and receiver of the user device; and in response to activating the wireless sensor, enabling the baseband, analog transmitter and receiver, wherein the baseband, analog transmitter and receiver poll to identify the wireless sensor-enabled device within the pre-determined distance.

In one aspect of an embodiment, the baseband, analog transmitter and receiver may be enabled for a pre-determined time period and disabled after the pre-determined time period has elapsed.

In one aspect of an embodiment, the wireless sensor may be one of a near field communication (NFC) sensor, a Bluetooth sensor, or an optical reader associated with a barcode or a quick response code.

In another embodiment, a computer-implemented method may be provided. The method may include detecting, by a user device comprising one or more processors, one or more motions of a user device; analyzing, by the user device, the one or more motions to identify a pre-defined motion; enabling, by the user device, a wireless sensor in response to the identified pre-defined motion; determining, by the user device, that a wireless sensor-enabled device is within a pre-determined distance; exchanging, by the user device, data with the wireless sensor-enabled device; and disabling, by the user device, the wireless sensor upon completion of the exchange of data.

In one aspect of an embodiment, the one or more motions may be a touch-based gesture input.

In one aspect of an embodiment, the pre-defined motion may comprise at least one of a tap motion, a wave motion, a circular motion, a swipe motion, or a user-defined custom motion of the user device.

In one aspect of an embodiment, the one or more motions may be detected by one or more sensors comprising at least one of an accelerometer, a gyroscope, or a compass.

In one aspect of an embodiment, the method may include disabling a baseband, analog transmitter and receiver of the user device; and in response to activating the wireless sensor, enabling the baseband, analog transmitter and receiver, wherein the baseband, analog transmitter and receiver poll to identify the wireless sensor-enabled device within the pre-determined distance.

In one aspect of an embodiment, the baseband, analog transmitter and receiver may be enabled for a pre-determined time period and disabled after the pre-determined time period has elapsed.

In one aspect of an embodiment, the wireless sensor may be one of a near field communication (NFC) sensor, a Bluetooth sensor, or an optical reader associated with a barcode or a quick response code.

In another embodiment, a system may be provided. The system may include at least one memory storing computer-executable instructions; and at least one processor. The at least one processor may be configured to access the at least one memory and to execute the computer-executable instructions to detect one or more motions from a user of a user device; analyze the one or more motions to identify a pre-defined motion; enable a wireless sensor in response to the identified pre-defined motion; determine that a wireless sensor-enabled device is within a pre-determined distance; exchange data with the wireless sensor-enabled device; and disable the wireless sensor upon completion of the exchange of data.

In one aspect of an embodiment, the one or more motions may be a touch-based gesture input.

In one aspect of an embodiment, the pre-defined motion may comprise at least one of a tap motion, a wave motion, a circular motion, a swipe motion, or a user-defined custom motion of the user device.

In one aspect of an embodiment, the one or more motions may be detected by one or more sensors comprising at least one of an accelerometer, a gyroscope, or a compass.

In one aspect of an embodiment, the at least one processor may be further configured to execute the computer-executable instructions to disable a baseband, analog transmitter and receiver of the user device; and in response to activating the wireless sensor, enable the baseband, analog transmitter and receiver, wherein the baseband, analog transmitter and receiver poll to identify the wireless sensor-enabled device within the pre-determined distance.

In one aspect of an embodiment, the baseband, analog transmitter and receiver may be enabled for a pre-determined time period and disabled after the pre-determined time period has elapsed.

In one aspect of an embodiment, the wireless sensor may be one of a near field communication (NFC) sensor, a Bluetooth sensor, or an optical reader associated with a barcode or a quick response code.

In another embodiment, an apparatus may be provided. The apparatus may include at least one antenna; at least one transceiver; at least one memory storing computer-executable instructions; and at least one processor, wherein the at least one processor may be configured to access the at least one memory and to execute the computer-executable instructions to detect one or more motions from a user of a user device; analyze the one or more motions to identify a pre-defined motion; enable a wireless sensor in response to the identified pre-defined motion; determine that a wireless sensor-enabled device is within a pre-determined distance; exchange data with the wireless sensor-enabled device; and disable the wireless sensor upon completion of the exchange of data.

In one aspect of an embodiment, the input may be a touch-based gesture input.

In one aspect of an embodiment, the pre-defined motion may comprise at least one of a tap motion, a wave motion, a circular motion, a swipe motion, or a user-defined custom motion of the user device.

In one aspect of an embodiment, the one or more motions may be detected by one or more sensors comprising at least one of an accelerometer, a gyroscope, or a compass.

In one aspect of an embodiment, the at least one processor may be further configured to execute the computer-executable instructions to disable a baseband, analog transmitter and receiver of the user device; and in response to activating the wireless sensor, enable the baseband, analog transmitter and receiver, wherein the baseband, analog transmitter and receiver poll to identify the wireless sensor-enabled device within the pre-determined distance.

In one aspect of an embodiment, the baseband, analog transmitter and receiver may be enabled for a pre-determined time period and disabled after the pre-determined time period has elapsed.

In one aspect of an embodiment, the wireless sensor may be one of a near field communication (NFC) sensor, a Bluetooth sensor, or an optical reader associated with a barcode or a quick response code.

In another embodiment, a system may be provided. The system may include a means for detecting one or more motions of a user device; a means for analyzing the one or more motions to identify a pre-defined motion; a means for enabling a wireless sensor in response to the identified pre-defined motion; a means for determining that a wireless sensor-enabled device is within a pre-determined distance; a means for exchanging data with the wireless sensor-enabled device; and a means for wireless disabling the sensor upon completion of the exchange of data.

In one aspect of an embodiment, the input may be a touch-based gesture input.

In one aspect of an embodiment, the pre-defined motion may comprise at least one of a tap motion, a wave motion, a circular motion, a swipe motion, or a user-defined custom motion of the user device.

In one aspect of an embodiment, the one or more motions may be detected by one or more sensors comprising at least one of an accelerometer, a gyroscope, or a compass.

In one aspect of an embodiment, the system may include a means for disabling a baseband, analog transmitter and receiver of the user device; and in response to activating the sensor, a means for enabling the baseband, analog transmitter and receiver, wherein the baseband, analog transmitter and receiver poll to identify the wireless sensor-enabled device within the pre-determined distance.

In one aspect of an embodiment, the baseband, analog transmitter and receiver may be enabled for a pre-determined time period and disabled after the pre-determined time period has elapsed.

In one aspect of an embodiment, the wireless sensor may be one of a near field communication (NFC) sensor, a Bluetooth sensor, or an optical reader associated with a barcode or a quick response code.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A non-transitory computer-readable medium storing computer-executable instructions which, when executed by a processor, cause the processor to perform operations comprising:
   detecting one or more motions of a user device;
   analyzing the one or more motions to identify a pre-defined motion;
   enabling a wireless sensor in response to the identified pre-defined motion;
   determining that a wireless sensor-enabled device is within a pre-determined distance;
   exchanging data with the wireless sensor-enabled device;
   detecting one or more second motions of the user device;
   analyzing the one or more second motions to identify a second pre-defined motion; and
   disabling the wireless sensor in response to the identified second pre-defined motion.

2. The non-transitory computer-readable medium of claim 1, wherein the one or more motions is a touch-based gesture input.

3. The non-transitory computer-readable medium of claim 1, wherein the pre-defined motion comprises at least one of a tap motion, a wave motion, a circular motion, a swipe motion, or a user-defined custom motion of the user device.

4. The non-transitory computer-readable medium of claim 1, wherein the one or more motions are detected by one or more sensors comprising at least one of an accelerometer, a gyroscope, or a compass.

5. The non-transitory computer-readable medium of claim 1, wherein the computer-executable instructions cause the processor to perform further operations comprising:
   disabling a baseband, analog transmitter and receiver of the user device; and
   in response to activating the wireless sensor, enabling the baseband, analog transmitter and receiver, wherein the baseband, analog transmitter and receiver poll to identify the wireless sensor-enabled device within the pre-determined distance.

6. The non-transitory computer-readable medium of claim 5, wherein the baseband, analog transmitter and receiver are enabled for a pre-determined time period and disabled after the pre-determined time period has elapsed.

7. The non-transitory computer-readable medium of claim 1, wherein the wireless sensor is one of a near field communication (NFC) sensor, a Bluetooth sensor, or an optical reader associated with a barcode or a quick response code.

8. A computer-implemented method comprising:
   detecting, by a user device comprising one or more processors, one or more motions of a user device;
   analyzing, by the user device, the one or more motions to identify a pre-defined motion;

enabling, by the user device, a wireless sensor in response to the identified pre-defined motion;

determining, by the user device, that a wireless sensor-enabled device is within a pre-determined distance;

exchanging, by the user device, data with the wireless sensor-enabled device;

detecting, by the user device, one or more second motions of the user device;

analyzing, by the user device, the one or more second motions to identify a second pre-defined motion; and disabling, by the user device, the wireless sensor in response to the identified second pre-defined motion.

9. The computer-implemented method of claim 8, wherein the one or more motions is a touch-based gesture input.

10. The computer-implemented method of claim 8, wherein the pre-defined motion comprises at least one of a tap motion, a wave motion, a circular motion, a swipe motion, or a user-defined custom motion of the user device.

11. The computer-implemented method of claim 8, wherein the one or more motions is detected by one or more sensors comprising at least one of an accelerometer, a gyroscope, or a compass.

12. The computer-implemented method of claim 8, further comprising:

disabling a baseband, analog transmitter and receiver of the user device; and in response to activating the wireless sensor, enabling the baseband, analog transmitter and receiver, wherein the baseband, analog transmitter and receiver poll to identify the wireless sensor-enabled device within the pre-determined distance.

13. The computer-implemented method of claim 12, wherein the baseband, analog transmitter and receiver are enabled for a pre-determined time period and disabled after the pre-determined time period has elapsed.

14. The computer-implemented method of claim 8, wherein the wireless sensor is one of a near field communication (NFC) sensor, a Bluetooth sensor, or an optical reader associated with a barcode or a quick response code.

15. A system comprising:

at least one memory storing computer-executable instructions; and at least one processor, wherein the at least one processor is configured to access the at least one memory and to execute the computer-executable instructions to:

detect one or more motions from a user of a user device;

analyze the one or more motions to identify a pre-defined motion;

enable a wireless sensor in response to the identified pre-defined motion;

determine that a wireless sensor-enabled device is within a pre-determined distance;

exchange data with the wireless sensor-enabled device;

detect one or more second motions of the user device;

analyze the one or more second motions to identify a second pre-defined motion; and disable the wireless sensor in response to the identified second pre-defined motion.

16. The system of claim 15, wherein the one or more motions is a touch-based gesture input.

17. The system of claim 15, wherein the pre-defined motion comprises at least one of a tap motion, a wave motion, a circular motion, a swipe motion, or a user-defined custom motion of the user device.

18. The system of claim 15, wherein the one or more motions are detected by one or more sensors comprising at least one of an accelerometer, a gyroscope, or a compass.

19. The system of claim 15, wherein the at least one processor is further configured to execute the computer-executable instructions to:

disable a baseband, analog transmitter and receiver of the user device; and in response to activating the wireless sensor, enable the baseband, analog transmitter and receiver, wherein the baseband, analog transmitter and receiver poll to identify the wireless sensor-enabled device within the pre-determined distance.

20. The system of claim 19, wherein the baseband, analog transmitter and receiver are enabled for a pre-determined time period and disabled after the pre-determined time period has elapsed.

21. The system of claim 15, wherein the wireless sensor is one of a near field communication (NFC) sensor, a Bluetooth sensor, or an optical reader associated with a barcode or a quick response code.

* * * * *